J. C. SHELER & R. B. AUSTIN.
MOUNTING FOR THE FRONT WHEELS OF TRUCKS.
APPLICATION FILED MAY 10, 1918.
1,298,412.
Patented Mar. 25, 1919.
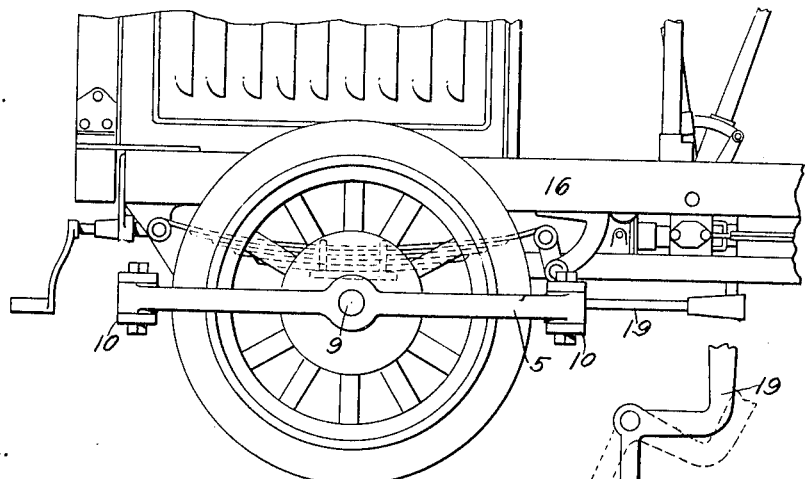
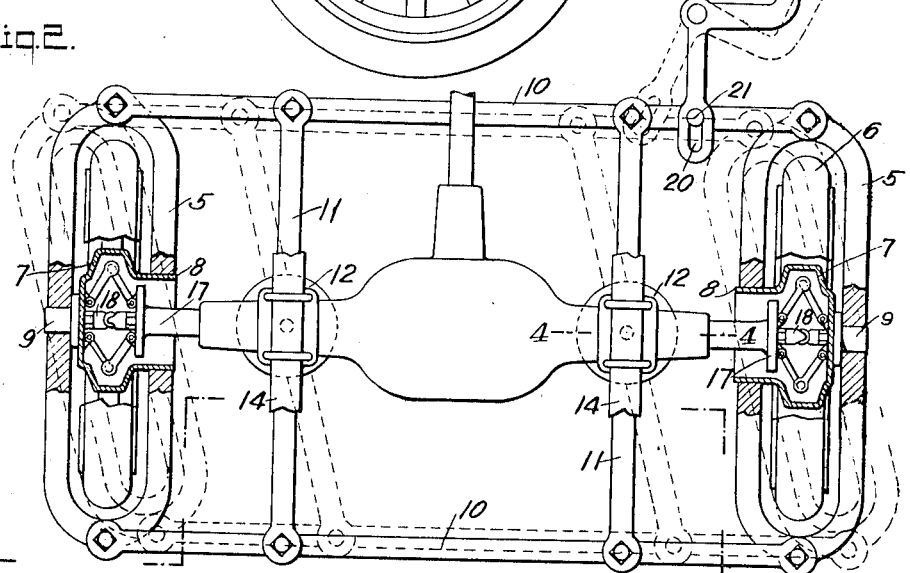
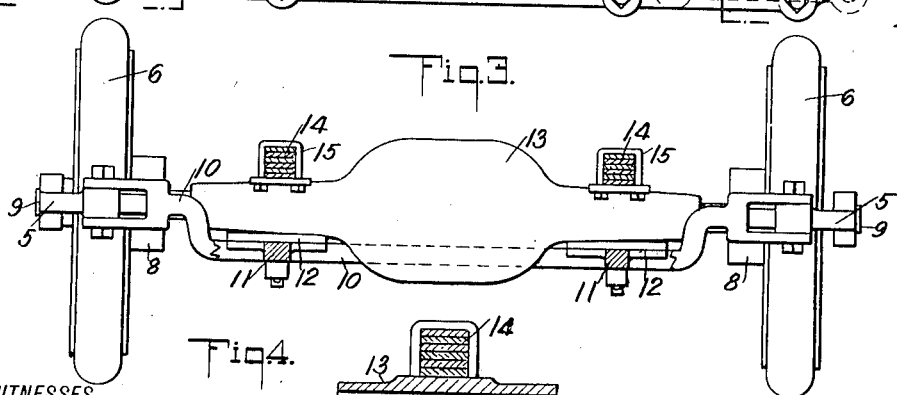
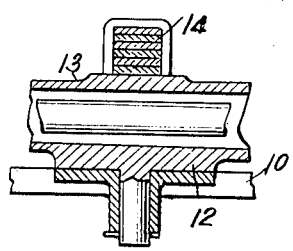
WITNESSES
INVENTORS
J. C. Sheler
R. B. Austin
BY
ATTORNEYS

UNITED STATES PATENT OFFICE.

JOHN C. SHELER AND RAYMOND B. AUSTIN, OF CADILLAC, MICHIGAN.

MOUNTING FOR THE FRONT WHEELS OF TRUCKS.

1,298,412.   Specification of Letters Patent.   Patented Mar. 25, 1919.

Application filed May 10, 1918. Serial No. 233,697.

*To all whom it may concern:*

Be it known that we, JOHN C. SHELER and RAYMOND B. AUSTIN, citizens of the United States, residing at Cadillac, in the county of Wexford and State of Michigan, have invented a new and Improved Mounting for the Front Wheels of Trucks, of which the following is a full, clear, and exact description.

An object of the invention is to provide a mounting for the front drive of a vehicle which will be simple, inexpensive and efficient.

Another object of the invention is to provide a mounting for the front wheels of a truck which will give a resilient connection between the mounting and the truck frame.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a fragmentary side elevation of the forward end of a truck equipped with a wheel mounting embodying our invention;

Fig. 2 is a plan of the mounting, certain parts being broken out to show the details of construction;

Fig. 3 is a section on line 3—3, Fig. 2; and

Fig. 4 is a section on line 4—4, Fig. 2.

Referring to the drawings, 5 is a wheel frame in the shape of a closed loop adapted to embrace a wheel 6 which has a head 7 provided with an inwardly-directed sleeve 8 projecting out of the frame and bearing therein. The head has also a trunnion 9 bearing in the frame 5. The two frames 5 are spaced by rods 10 which are pivotally connected to said frames in the central longitudinal planes of said frames.

The rods 10 are in turn interconnected pivotally by braces 11 which form the support for the turntables 12 to which the axle housing 13 is secured and also the semielliptic springs 14. The semielliptic springs are anchored by yokes 15 between the ends, while the ends of the spring are connected to the frame 16 of the carriage. The springs 14, therefore, connect yieldingly the wheel mounting to the frame 16.

The ends 17 of the axles enter through the adjacent sleeves 8 into the hubs whereat the ends 17 are connected by universal joints 18 to the hubs and, in consequence, the motion from the axles is transmitted to the wheels 6. The universal joints 18 allow the steering of the wheels by the rod 19 of the steering mechanism. The rod 19 has an elongated slot 20 which engages a pin 21 on the inner rod 10. The connection between the frames 5, rods 10 and braces 11 constitutes a mounting having a parallel movement which is controllable by the rod 19 of the steering mechanism, the displacement of the wheels being shown in dotted lines in Fig. 2.

As will be seen from the drawings, the mounting is movable about the turntables 12 which form also the yielding support between the mounting and the frame 16. If any object strikes the front bar 10 obliquely thereto the tendency of the mounting would be to move on its pivot, thereby reducing the impact which, in addition, is resisted by the springs interposed between the mounting and the frame.

We claim:

1. A wheel mounting for trucks comprising in combination, a truck frame, wheel frames, a wheel revolubly mounted in each frame, rods connecting the wheel frames pivotally, braces connected pivotally to the rods and adapted to be disposed parallelly to the wheels, an axle housing having a pivotal connection with the braces, axles in the housing, a universal joint connecting the axles to the wheels, and springs interposed between the axle housing and the truck frame.

2. A wheel mounting for trucks comprising in combination, a truck frame, wheel frames, a wheel revolubly mounted in each frame, rods connecting the wheel frames pivotally and adapted to run substantially parallel to the axis of the wheels, braces connecting the rods pivotally and adapted to be disposed in planes parallel to the planes of the wheels, an axle housing and axles, turntables connecting the housing to the braces, a universal joint interposed between each of the wheels and the axles, and springs connected to the turntables and to the truck frame.

3. A wheel mounting for trucks comprising in combination, a truck frame, wheel frames, a wheel revolubly mounted in each frame, rods pivotally connecting the wheel frames, braces pivotally connecting the rods, axles and axle-housing, turntables connecting the housing to the braces, a universal joint associated with the hub of each wheel and connected to the axles, and semielliptical springs anchored between their ends to the turntables and having their ends connected to the truck frame.

JOHN C. SHELER.
RAYMOND B. AUSTIN.